United States Patent
Pape

(10) Patent No.: US 7,516,205 B2
(45) Date of Patent: Apr. 7, 2009

(54) SYSTEM AND METHOD FOR CONCURRENTLY DECODING AND TRANSMITTING A MEMORY REQUEST

(75) Inventor: John D. Pape, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 885 days.

(21) Appl. No.: 10/919,153

(22) Filed: Aug. 16, 2004

(65) Prior Publication Data

US 2006/0036815 A1 Feb. 16, 2006

(51) Int. Cl.
*G06F 15/167* (2006.01)
*G06F 15/173* (2006.01)

(52) U.S. Cl. ........................ 709/223; 709/212; 709/213; 709/216

(58) Field of Classification Search ........................ None
See application file for complete search history.

(56) References Cited

U.S. PATENT DOCUMENTS

| 6,201,789 | B1 * | 3/2001 | Witkowski et al. ........... 370/230 |
| 6,275,905 | B1 * | 8/2001 | Keller et al. ................. 711/141 |
| 6,393,529 | B1 * | 5/2002 | Keller ......................... 711/141 |
| 6,453,388 | B1   | 9/2002 | Gonzales et al. |
| 6,604,190 | B1   | 8/2003 | Tran |
| 6,643,745 | B1   | 11/2003 | Palanca et al. |
| 6,728,841 | B2 * | 4/2004 | Keller ......................... 711/146 |
| 7,047,370 | B1 * | 5/2006 | Jeter et al. ................... 711/154 |
| 2005/0080869 | A1 * | 4/2005 | Bender et al. ............... 709/212 |

* cited by examiner

*Primary Examiner*—John B. Walsh

(57) ABSTRACT

A system comprises a plurality of nodes coupled together wherein each node has access to associated memory. Further, each node is adapted to transmit a memory request to at least one other node while concurrently decoding the memory request to determine which node contains the memory targeted by the memory request.

15 Claims, 3 Drawing Sheets

SYSTEM AND METHOD FOR CONCURRENTLY DECODING AND TRANSMITTING A MEMORY REQUEST

BACKGROUND

Computer systems may employ multiple processors to increase processing power. The workload may be divided and distributed among the various processors, thereby reducing execution time and increasing performance. In such systems, resources such as processors and memory may be segmented into groups referred to as "nodes." Each node may comprise one or more processors coupled to a physical memory device. A processor in a node may access the memory assigned to its node, a process referred to as "local memory referencing," or the processor may access memory assigned to other nodes, referred to as "remote memory referencing." Unfortunately, remote memory referencing results in increased latency and thus reduced performance relative to local memory referencing.

BRIEF SUMMARY

In accordance with at least some embodiments, a system comprises a plurality of nodes coupled together wherein each node has access to associated memory. Further, each node is adapted to transmit a memory request to at least one other node while concurrently decoding the memory request to determine which node contains the memory targeted by the memory request.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. As used herein, "data" refers to any type of information including data and instructions.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
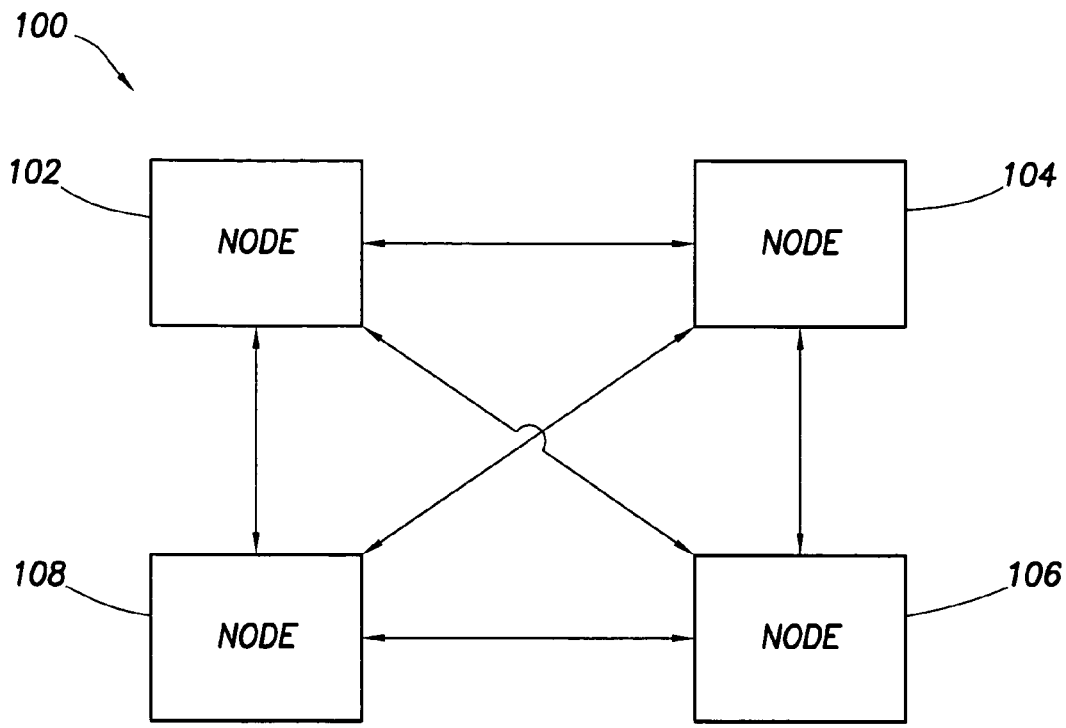
FIG. 1 shows a system in accordance with embodiments of the invention and including a plurality of nodes.

FIG. 1 shows a system 100 configured in accordance with exemplary embodiments of the invention. As shown, system 100 comprises a plurality of nodes 102, 104, 106, and 108. Although four nodes are shown, alternatively, any number of nodes can be provided. Each node generally is configured to couple to and communicate with all other nodes. For example, node 102 is adapted to couple to nodes 104-108. As such, node 102 can read from or write to the other nodes' memory, discussed below with regard to FIG. 2.

Figure 2:
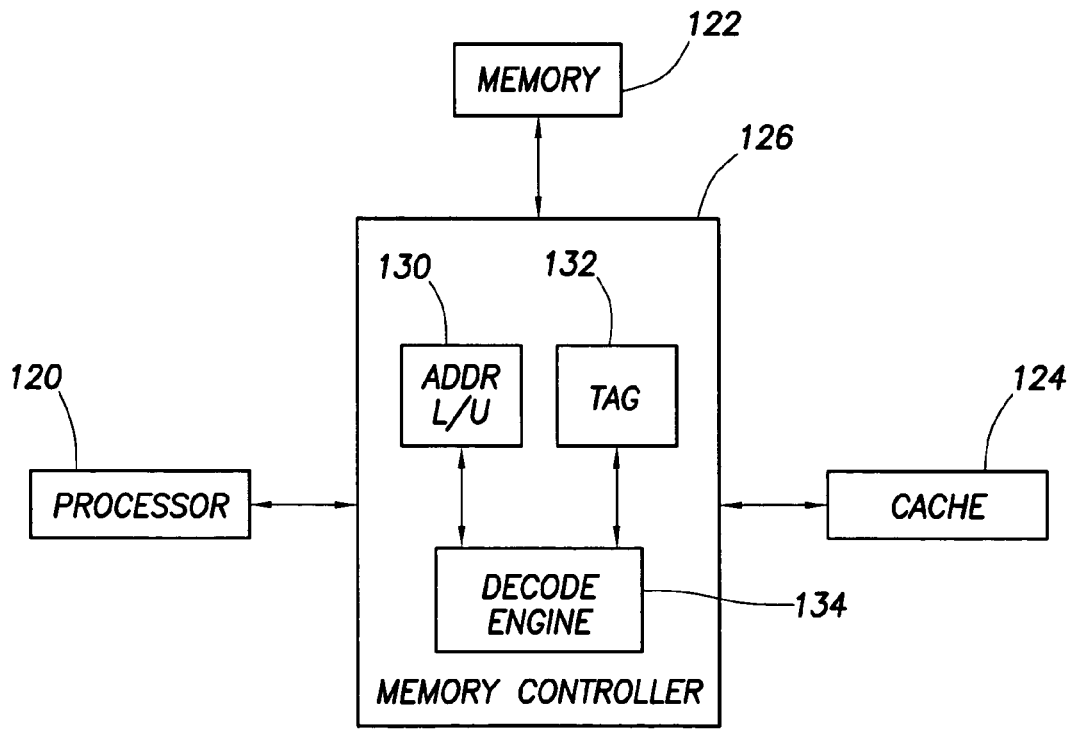
FIG. 2 shows a block diagram of the nodes of FIG. 1.

FIG. 2 shows an exemplary block diagram representative of each of the nodes in system 100. As shown, each node comprises a processor 120, memory 122, and cache memory 124 coupled to a memory controller 126. Although only one processor 120 is shown in FIG. 2, more than one processor 120 may be provided as desired. Memory 122 generally comprises the main random access memory ("RAM") of the node. Cache memory 124 comprises memory that may be accessed by the processor 120 with less latency than main memory 122. Cache memory 124 may cache data from the main memory of the node it resides on as well as from memory on another node.

The memory controller 126 comprises an address look-up table 130 and a tag 132 coupled to a decode engine 134. The memory controller 126 functions to coordinate accesses to memories 122 and 124 on behalf of the processor 120 and other devices that may be present in the node. Each memory request contains an address of a target memory location. The target memory location may be contained in memory in the node that decodes the memory request or in memory associated with another node. The decode engine 134 decodes the memory request to determine the referenced address. The decode engine compares the address from the memory request to entries in the address look-up table 130. The entries in the address look-up table 130 specifies addresses or ranges of addresses that identify the memory associated with the node.

Using information stored in the address look-up table 130, the decode engine 134 can determine whether the referenced memory address is in the memory associated with local node or a remote node. If the referenced memory address pertains to memory associated with one of the remote nodes, the decode engine 134, using the address look-up table 130, determines which remote node contains the requested data.

If the decoded address pertains to the "local" node (i.e., the node that initially receives and decodes the memory request), the local node completes the memory request (e.g., reads or writes the target location). If, however, the decoded address pertains to a "remote" node (i.e., a node other than the local node), the memory request is completed by the remote node.

In accordance with exemplary embodiments of the invention, the memory controller 126 forwards a request for a memory request to one or more remote nodes before determining whether the memory request contains an address that corresponds to memory in any of the remote nodes. In this way, if the local node eventually determines that a remote node contains the targeted memory request, the targeted remote node has already been provided with the memory request and has already begun to process the memory request. The time that the remote node(s) expend beginning to process the memory request is expended in parallel with the local node determining the location of the memory request. Thus, time is saved and latency is reduced. This process is explained in greater detail below.

As noted above, the local node forwards the request to one or more remote nodes in parallel with completing the decode process. If desired, the memory request may be forwarded to all remote nodes or to any number of remote numbers greater than or equal to one. In the example of FIG. 1, a local node may forward a memory request to the other three nodes. The process of forwarding the memory request may comprise "broadcasting" the memory request to a target set of remote nodes. Broadcasting the memory request may comprise issuing a request that is encoded with information that causes all other nodes to receive and process the request.

Figure 3:
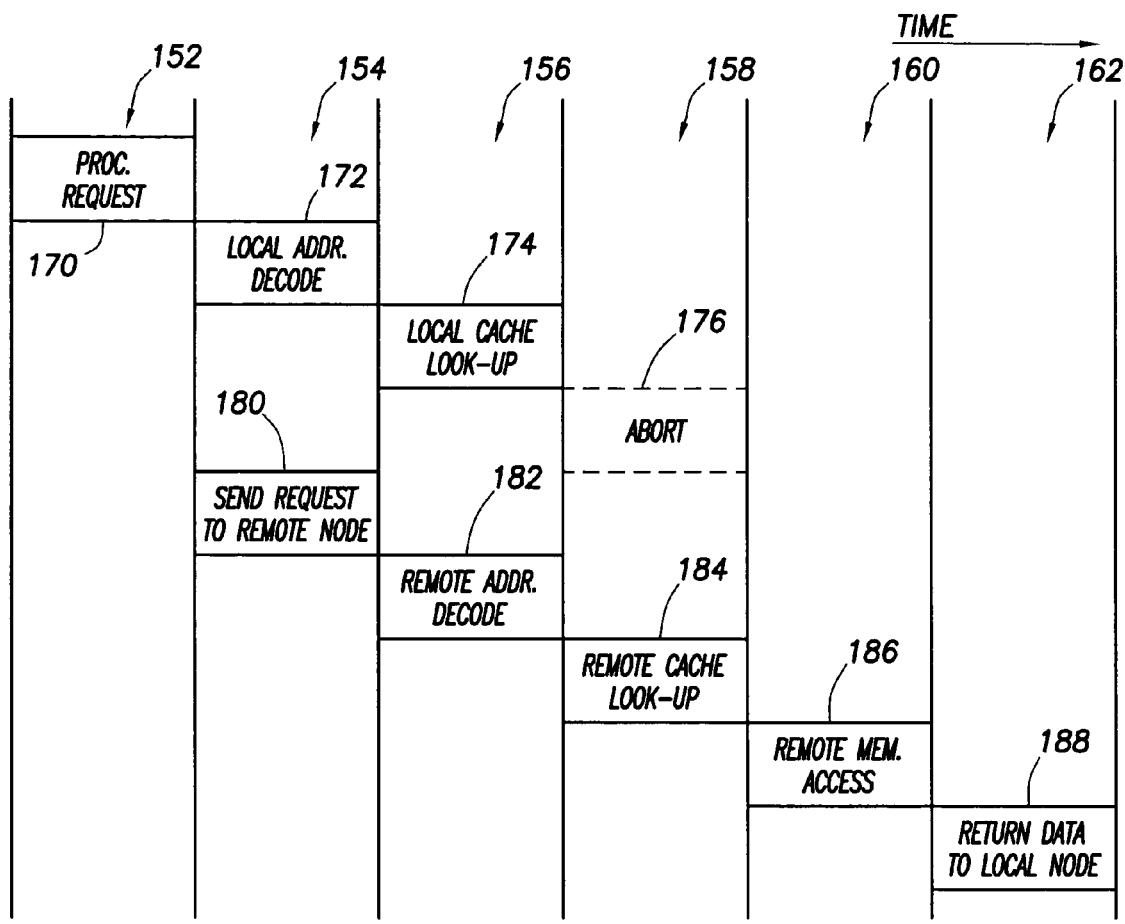
FIG. 3 illustrates the operation of the system of FIG. 1.

FIG. 3 conceptually depicts locally decoding a memory request while concurrently sending the memory request to one or more remote. FIG. 3 shows a plurality of consecutive time slots 152-162. Each time slot may encompass one or more cycles of a clock used by each node. In time slots 152-156, the local node submits a request containing a memory address (170), decodes the address (172), and examines the local cache (174), respectively. Beginning in time slot 154, the local node also sends the request to the remote node(s) (180), following which the remote node decodes the address in the request (182), examines the remote cache 184, accesses the remote memory for the requested data (186) and returns the requested data to the local node (188). As shown, actions 180 and 182 occur concurrently with actions 172 and 174. Alternatively stated, while the local node decodes the address in the memory request and examines the local cache, the local node also sends the request to a remote node which then begins the process of decoding the address and obtaining the requested data.

Referring still to FIG. 3, the local node may eventually determine that the local node contains the requested data. In this situation, the local node aborts (176) the remote node's attempt to decode and process to completion the memory request. The abort causes the remote node to discontinue further processing of the memory request. The actions depicted within each time slot may span more than one time slot. For example, the process 180 of sending the memory request to a remote node may span into time slots 156 and further. As such, aborting the remote node that is processing the memory request may occur while the memory request is still being transmitted to the remote node. The length of time required to perform each action shown in FIG. 3 is a function of a number of parameters and in general is system specific.

Figure 4:
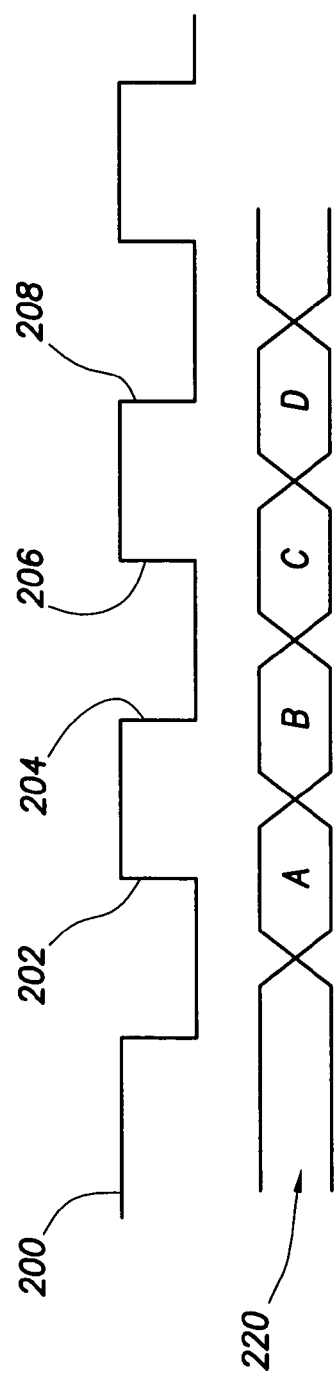
FIG. 4 illustrates an embodiment for aborting a remote memory request.

In accordance with some embodiments, transmission of the memory request to the remote node (action 180) may require multiple clock cycles. FIG. 4 depicts a clock signal 200. Clock 200 comprises a plurality of rising and falling edges 202-208. Reference numeral 220 depicts the timing of a transfer of a memory request from a local node to a remote node. In the example of FIG. 4, the transfer requires four consecutive clock edges 202-208. The memory request is transferred in four phases A, B, C and D as shown. Phases A and B of the exemplary remote request packet contain the target memory address. The local node may finish locally decoding the address by the time phase D starts. As such, phase D may be encoded with information as to whether the remote request is to be aborted.

Figure 5:
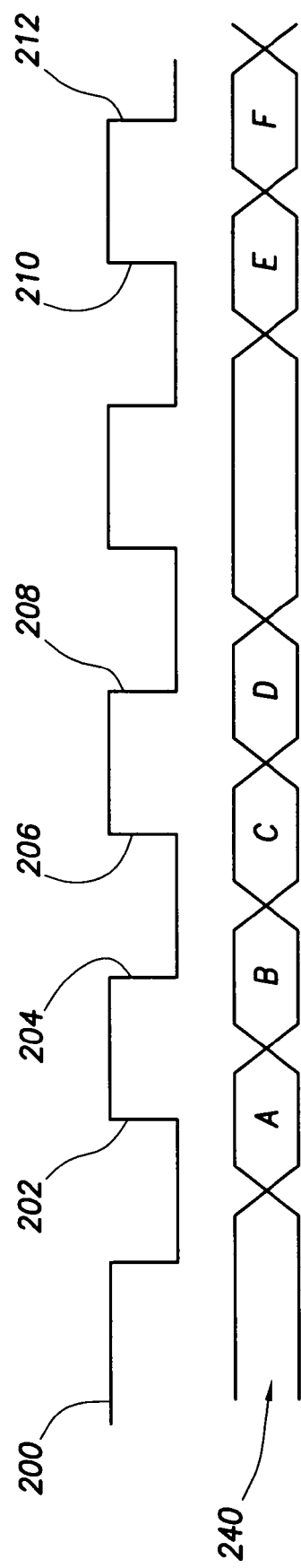
FIG. 5 illustrates an alternative embodiment for aborting a remote memory request.

In accordance with other embodiments, the local node may not be able to complete the local address decode by the time the transfer of the memory request to the remote node is complete. That is, phase D may complete before the local node has completed the local decode of the memory request. FIG. 5 illustrates this situation. To accommodate this situation, each memory request transferred to a remote node may be provided a request identifier ("ID"). The request ID is unique to the request meaning that each request contains a different request ID. When the local node completes the local decode and determines that the remote node needs to be aborted (by which time the remote node may have already received all phases of the memory request), the local node sends an abort packet to the remote node. The abort packet contains the request ID of the memory request that is to be aborted. In the example of FIG. 5, the remote node receives the abort packet as phases E and F. The remote node examines the abort packet for the request ID and ceases further processing of the relevant memory request. By using memory request unique request IDs, multiple memory requests may be sent to remote nodes and specific memory requests then may be aborted.

Referring again to FIG. 2, the memory controller's tag storage 132 contains a plurality of entries wherein each entry contains information as to whether the requested data is stored in cache 124 and the state of the cache (e.g., shared, exclusive, invalid, etc.). After initiating the broadcast of the memory request to a remote node, the local node may determine that the requested data is shared in cache 124 of multiple nodes including the local node and one or more remote nodes. As such, the local node has the requested data and thus need not retrieve the data from a remote node. In addition to aborting the remote memory request, however, the local node may request any remote node having a shared copy of the requested data to invalidate the copies of the data. By invalidating all remotely shared copies of the data, the local node may change the requested data by a write operation and preserve data coherency.

In various embodiments, the memory controller 126 of a node may comprise a plurality of decode engines. One of the decode engines may be dedicated for use in decoding memory requests from other nodes as described above. Another decode engine may be used to decode locally generated memory requests. Having a plurality of decode engines may permit the overall process of decoding local and remote memory requests to occur faster.

Figure 6:
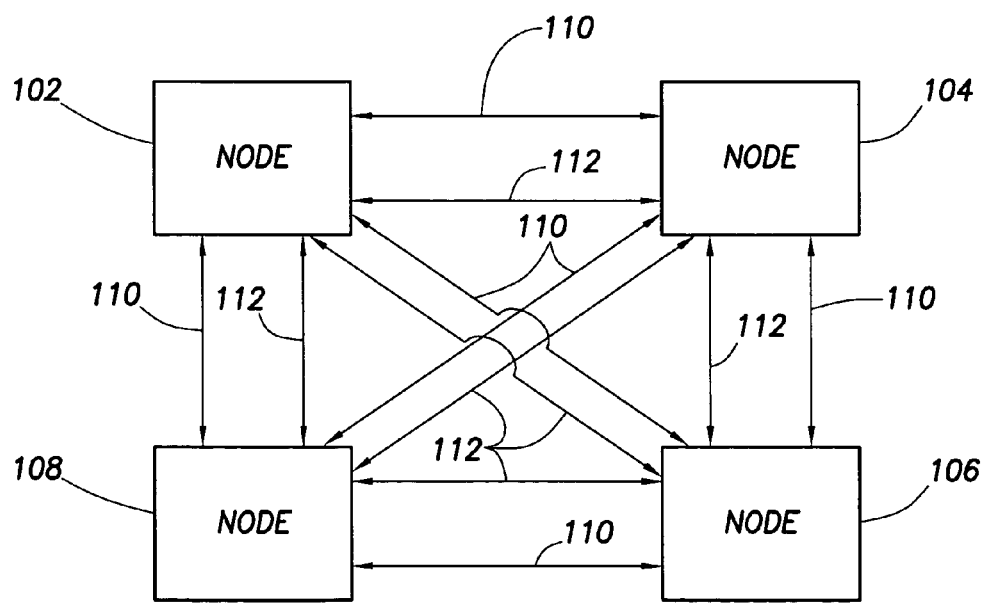
FIG. 6 illustrates an alternative embodiment of the system of FIG. 1.

The system 100 may permit the remote memory requests to be transmitted between nodes on the same communication link over which other types of inter-node communications are transmitted. Alternatively, a separate communication link may be included for the purpose of transmitting remote memory requests and abort packets between nodes. In this latter embodiment, a pair of nodes may be coupled by two communication links—one link dedicated for remote memory requests and abort packets and another link for all other types of inter-node traffic. FIG. 6 illustrates such a configuration in which inter-node communication links 110 may be used for remote memory requests and abort packets and communication links 112 may be used for other types of traffic.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of nodes coupled together, each node having access to associated memory; and
   wherein each node is adapted to transmit a memory request to at least one other node while concurrently decoding the memory request to determine which node contains the memory targeted by the memory request;
   wherein the node that transmits the memory request to at least one other node causes the at least one other node to abort processing of the transmitted memory request after determining that the memory reguest targets memory local to the node that transmits the memory reguest.

2. The system of claim 1 wherein each node is adapted to transmit the memory request to all other nodes while concurrently decoding the memory request.

3. The system of claim 2 wherein the node that transmits the memory request to all other nodes causes all nodes to abort processing of the transmitted memory request.

4. The system of claim 1 wherein, each node that is transmitted the memory request begins to process the memory request while the node that transmitted the memory request decodes the memory request.

5. The system of claim 1 wherein the node that transmits the memory request to at least one other node causes the at least one other node to abort processing of the transmitted memory request by preventing completion of the memory request transmission to the at least one other node.

6. The system of claim 1 wherein the node that transmits the memory request to at least one other node causes the at least one other node to abort processing of the transmitted memory request by transmitting an abort packet to the at least one other node.

7. The system of claim 1 wherein a plurality of communication links couple together pairs of nodes, one communication link adapted to be used to transmit the memory request and another communication link adapted to be used for non-memory request traffic.

8. An electrical device adapted to communicate with at least one remote device that contains remote memory, comprising:
   a decode engine; and
   local memory coupled to the decode engine;
   wherein, while the decode engine decodes a memory request, the electrical device simultaneously sends the memory request to the at least one remote device for processing therein; and
   wherein the electrical device is adapted to cause the at least one remote device to cease processing the memory request upon determining that the at least one remote device does not have the data requested by the memory request.

9. The electrical device of claim 8 wherein the electrical device is adapted to communicate with a plurality of remote devices and to broadcast the memory request to all remote nodes while the decode engine simultaneously decodes the memory request.

10. The electrical device of claim 9 wherein the decode engine determines that a particular remote device has the requested data and selectively causes all other remote devices to cease processing the memory request.

11. The electrical device of claim 8 wherein the memory request includes an ID that differentiates that memory request from other memory requests and the electrical device is adapted to transmit an abort packet containing the ID to the at least one remote device to cause the remote device to cease processing the memory request identified by the ID.

12. An electrical device adapted to communicate with a plurality of remote devices, each containing remote memory, comprising:
    local memory; and
    means for simultaneously decoding a memory request to determine which device contains data targeted by the memory request, for transmitting the memory request to the remote devices for processing therein, and, after determining that the memory request targets memory local to the device that transmitted the memory request, for aborting processing of the memory request in the remote devices.

13. The electrical device of claim 12 further comprising a cache and means for examining the cache to determine if the cache contains the targeted data while the remote devices decode the memory request.

14. A method, comprising:
    beginning to decode a memory request in a local node to determine if the local node contains data that is targeted by the memory request;
    before completing the decode of the memory request, transmitting the memory request to a separate node for decoding by the separate node; and
    determining which node has the data targeted by the memory request and the local node preventing the separate node from completing the memory request upon the local node determining that the separate node does not have the data.

15. The method of claim 14 further comprising, upon the local node determining that the separate node has a shared copy of the data, the local node causing the separate node to invalidate the separate node's shared copy of the data.

* * * * *

UNITED STATES PATENT AND TRADEMARK OFFICE
CERTIFICATE OF CORRECTION

PATENT NO. : 7,516,205 B2  Page 1 of 1
APPLICATION NO. : 10/919153
DATED : April 7, 2009
INVENTOR(S) : John D. Pape It is certified that error appears in the above-identified patent and that said Letters Patent is hereby corrected as shown below:

In column 5, line 13, in Claim 1, delete "reguest" and insert -- request --, therefor.

In column 5, line 14, in Claim 1, delete "reguest" and insert -- request --, therefor.

Signed and Sealed this

Third Day of November, 2009

David J. Kappos
*Director of the United States Patent and Trademark Office*